United States Patent

[11] 3,593,342

| [72] | Inventors | John J. Niebauer;<br>Paul Kahn, both of San Francisco, Calif. |
|---|---|---|
| [21] | Appl. No. | 793,994 |
| [22] | Filed | Jan. 27, 1969 |
| [45] | Patented | July 20, 1971 |
| [73] | Assignee | Cutler Laboratories, Inc.<br>Berkeley, Calif. |

[54] PROSTHETIC JOINT
18 Claims, 8 Drawing Figs.

| [52] | U.S. Cl. | 3/1, 128/92 |
|---|---|---|
| [51] | Int. Cl. | A61f 1/24 |
| [50] | Field of Search | 3/1; 128/92, 92 C, DIG. 21 |

[56] References Cited

UNITED STATES PATENTS

| 3,462,765 | 8/1969 | Swanson | 3/1 |
|---|---|---|---|

FOREIGN PATENTS

| 939,226 | 2/1956 | Germany | 128/92 C |
|---|---|---|---|

OTHER REFERENCES

" Silicone Rubber Implants for Replacement of Arthritic or Destroyed Joints in the Hand" by Afred B. Swanson, M.D. SURGICAL CLINICS OF NORTH AMERICA, Vol. 48, No. 5, October 1968, pp. 113— 1127. Copy in Group 335. 3-1.

*Primary Examiner*—Richard A. Gaudet
*Assistant Examiner*—Ronald L. Frinks
*Attorney*—Owen, Wickersham & Erickson ABSTRACT: A prosthetic joint made of a fabric-reinforced unitary elastomeric member providing two tapering stems connected to opposite ends of a central portion having thick ends and a thin web and arranged to provide relative movement of one stem to the other in at least one direction while preventing movement in undesired directions. The stems are used for insertion into the interiors of each of two bones to be joined by the joint. The stems are overlaid with cloth fabric of a kind enabling better fixation of the prosthetic joint to the tissue in the bones.

PATENTED JUL 20 1971
3,593,342
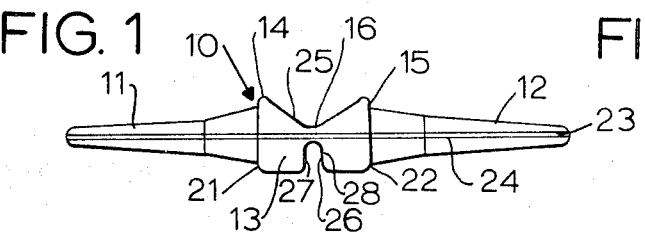
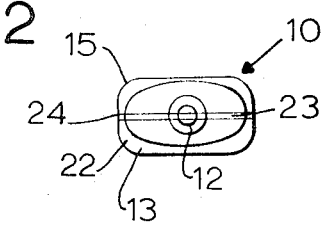
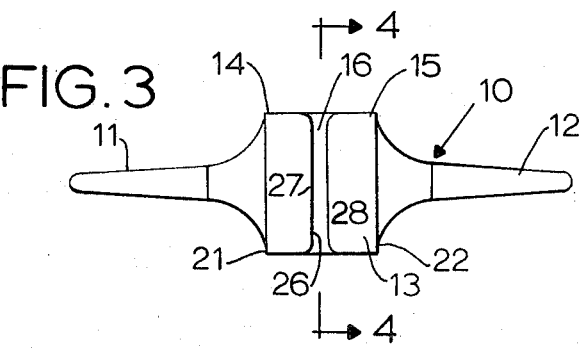
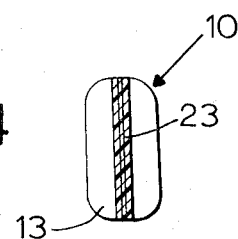
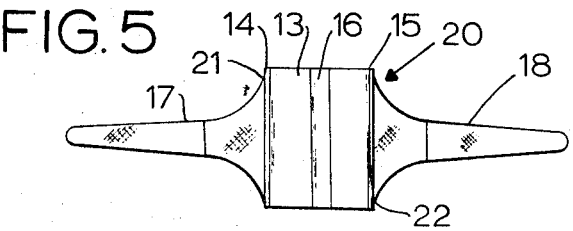
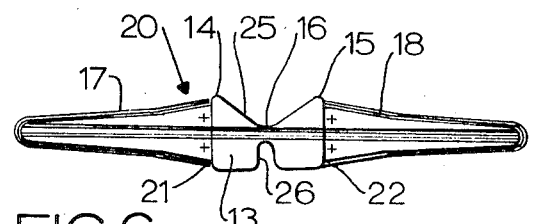
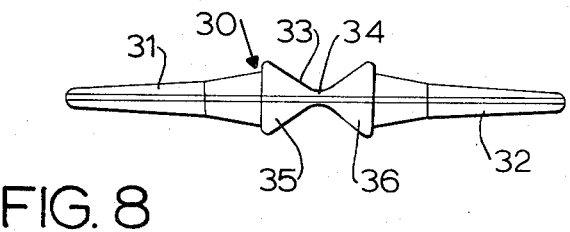
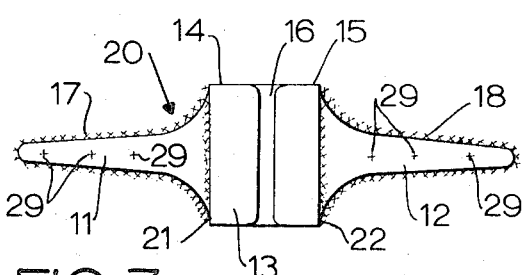
*INVENTOR.*
JOHN J. NIEBAUER
BY PAUL KAHN
*Owen, Wickersham & Erickson*
ATTORNEYS

PROSTHETIC JOINT

This invention relates to a prosthetic joint.

The invention is useful for reconstruction in the bodies of animals and men of various joints that may have been destroyed or debilitated or damaged by any of various diseases or accidents. It is particularly useful for reconstruction of metacarpo-phalangeal and interphalangeal joints destroyed or damaged by rheumatoid arthritis, infection or trauma. However, it is also useful for reconstruction of other joints such as wrist, metatarsal-phalangeal joints, etc.

Among the objects of the invention are to provide a prosthetic joint which is simple to manufacture and therefore not overly expensive; to provide a prosthetic joint which is simple in operation and enables a reasonable degree of joint motion; to provide a prosthetic joint which enables uncomplicated surgical application; to provide a prosthetic joint in which lateral stability and joint alignment are inherent in the prosthesis, so that ligamentous reconstruction is unnecessary; to provide a prosthetic joint in which fixation of the prosthesis may be accomplished by tissue incorporation rather than by mechanical means; and to provide a prosthetic joint in which tissue reaction is not detrimental to the host or to the functioning of the device.

These objects have been achieved by providing a structure in which two tapering stems are connected together by a central portion having a transverse web between them. The central portion has an end shelf enabling it to come snugly against the ends of each bone when each of the stems is inserted into the interior of the bones, into the medullary canal. The web provides a hinge structure, and the central portion may readily be made so as to limit relative motion of the two stems in each of two directions. Therefore, the bones that they join can move in a swinging hingelike movement within a prescribed number of degrees in one direction, while pivoting motion may be limited either to substantially zero or to a minor amount in the reverse direction.

Other objects and advantages of the invention will appear from the following description of some preferred embodiments thereof.

IN THE DRAWINGS:

FIG. 1 is a view in side elevation of the body of a prosthetic joint embodying the principles of the invention, before application of mesh over the stems.

FIG. 2 is a view in end elevation of the body of FIG. 1.

FIG. 3 is a bottom plan view of the joint of FIG. 1.

FIG. 4 is a view in section taken along the line 4—4 in FIG. 3.

FIG. 5 is a view similar to FIG. 3 of a joint after application of the mesh over the stems.

FIG. 6 is a view similar to FIG. 1 of the joint after application of the mesh over the stems.

FIG. 7 is a view similar to FIG. 5 showing the stitch points of the outer covering.

FIG. 8 is a view similar to FIG. 1 of a modified form of joint body.

Basically, the invention comprises a reinforced plastic molding 10 (FIG. 1) having two stems 11 and 12 on opposite sides of a central portion 13, the central portion itself having two end portions 14 and 15 connected together by a thin web 16. The two stems 11, 12 are encased in a cloth fabric covering 17, 18, to complete the joint 20.

The central portion 13 is preferably thickest at two ends 21 and 22, each preferably providing a shelf around the widest portion of the stems 11 and 12. The shelf 21 or 22 serves to engage the end of the bone into which its associated stem 11 or 12 is inserted, into the medullary canal. The stems 11 and 12 are rounded and tapered and somewhat flattened, so that instead of being true cones, they are two conical surfaces, as if they were sliced away from the center portion of the cone and put together, and they taper so that they fit smoothly into the bones. The sizes of the various parts are tailored to the particular joint involved, the bones involved, and to the size and age of the subject being provided with the joints, whether it be a person or an animal. Thus, if used for a metacarpo-phalangeal joint, it will be of course smaller than if used for a larger joint such as a knee or elbow or wrist. The joint perhaps has its widest application in the hand and foot but can be used elsewhere and is made in sizes appropriate to the use. A range of sizes can be carried by a manufacturer, so that they are available within standard sizes, and, if desired, special sizes may readily be made where required.

A reinforcement of fabric 23, preferably of polyester mesh (such as Dacron), is embedded in the plastic and extends along the horizontal center plane 24, preferably in a double layer. It provides reinforcement at the web 16 as well as at other places. Other fabrics may be used instead of polyester, so long as they are compatible with the plastic of the body 10 in which they are being put, and with the host.

The plastic itself may be any plastic having sufficient rigidity and elasticity and having no objectionable physiological or other qualities. A silicone rubber, a polysiloxane material, is the preferable elastomer, particularly the medical grade silicone, such as Silastic 372 or 373.

The exterior coverings 17 and 18 may also be made of cloth fabric such as Dacron mesh or other polyester or other material compatible with biological tissue and fluids.

The central portion 13 is adapted to provide the two portions 15 and 14 on opposite sides of the web 16, which expand out to the largest cross section at the ends 21 and 22. The central portion may be symmetric about the horizontal axis, as shown in a joint 30 in FIG. 8, where there is a body 33 between stems 31 and 32 having a web 34 between two triangular portions 35 and 36, enabling flexure in two directions. In most instances, as shown in FIG. 1, it is preferable to have a V-shaped portion 25 on one side of the web 16 and a narrow notch 26 on the opposite side. The narrow notch 26 has two walls 27 and 28 which lie close together; therefore, when the web 14 is flexed, the walls 27 and 28 limit the motion drastically in the direction that forces them together which is movement within a very few degrees, just as the joint in a finger cannot go back very far from the flat position. On the other side, the V-faced portion 25 is made to give whatever is desired in the way of a radius for the joint. This may be, for example, 100°, or 110°, or 90°, or any other figure that is suitable for the joint and preferably corresponds generally to what is found in the body already.

There may be variations in both the angle of the V 25, in the width of the notch 26, and in the thickness and width of all the various portions, depending upon the joint to which it is to be applied and to the size of the bones and other parts of the subject to which it is to be applied. The general proportions are illustrative of the principles of the invention.

The device is preferably molded to shape so far as the plastic is concerned with the inner reinforcing Dacron mesh 23 in place in the mold. The outer coverings 17 and 18 are placed on later, as a folded double layer. Prior to the folding, through and through back stitches 29 are provided at certain points, and through and through running stitches also are provided and then an overcasting stitch is put after the folding. This means that the fabric is in place firmly.

The shelves or lateral buttresses 21 and 22 increase the lateral stability of the device when it is installed, and they prevent migration of the stems 11 or 12 down the medullary canal. The Dacron mesh sleeves 17 and 18 also provide intramedullary fixation. The tapered waist of the hinge or web 16 provides ease of flexion without movable parts.

These joints have been applied both to animals and people in a good many tests and have been found to give satisfactory results. The materials are biologically satisfactory, and it has been found that the tissue quickly builds up and binds itself to the stems 11 and 12 and the Dacron mesh 17 and 18 thereon, so that tests made on animal joints after they had been in place for several weeks showed that the bond between the bone tissue and the joint stems was such that the prosthetic joint would be torn apart before the bond was broken.

The flex life of the prosthesis of FIG. 5 was tested on a machine designed to flex the prosthesis 90° at the rate of 50 flexions per minute. The prosthesis withstand 5 million flexions without mechanical failure or significant change in tensile strength. Other samples were later tested st 250 flexions per minute for more than 10 million flexions, also without failure or significant change.

An appropriate prosthetic trial model designed to test the characteristics of these materials in a series of animal experiments was cut from a 0.06 inch thick sheet of Silastic, in which a layer of tricot Dacron had been impregnated for additional support. Two layers of Dacron tricot mesh were then sewn around the stems of the prosthesis. A large series of such prostheses were placed in the metatarsal-phalangeal joint of the long toe bilaterally of 6-month old Rhode Island Red roosters for evaluation of both short and long term tissue response to the prosthesis, degree of fixation and incorporation of the prosthesis in the medullary canal, evidence of bony erosion, as well as evaluation of the range of joint motion maintained.

A midlateral exposure was used for implantation of the prosthesis, taking care to preserve the neurovascular bundle. The metatarsal head was resected and the medullary canal of both metatarsal and proximal phalanx was drilled to accept the prosthesis. The prosthesis was then inserted and the skin closed with interrupted wire sutures. Plaster immobilization was applied for ten days, and thereafter support was discontinued.

A total of 120 roosters containing 240 prostheses were evaluated in the various aspects of this study. Series of six roosters each were sacrificed at 1, 2, 4, 8, 16, and 32 weeks up to 1 year followup. At the time of sacrifice, one joint of each rooster was tested for incorporation of the prosthesis within the medullary canal, while the other joint was sectioned longitudinally for histological evaluation of tissue reaction in response to the prosthesis, as well as the degree of microscopic incorporation of the Dacron mesh into the medullary canal of the bone.

At 1 week, a representative histological section showed the Dacron thread to be surrounded by fibrin with a sparse number of cells migrating through the fibrin clot.

By 2 weeks, proliferation of fibroblasts had taken place in and about the Dacron fibers, and the fibrous tissue around the Dacron had matured considerably. No significant osteoid or new bone formation was noted.

By 4 weeks, well organized osteoid tissue was noted around threads of Dacron, and the Dacron fibers were becoming firmly imbedded in fibrous tissue. Considerable amounts of osteoid tissue were also present. There was still no significant inflammatory response both around the Dacron and along the smooth margin adjacent to where the silicone rubber body of the prosthesis was prior to sectioning.

By 32 weeks, the long-term response to the prosthetic implant was demonstrated. Dense bony incorporation of the Dacron was observed without any evidence of implant rejection. No cysts or areas of bony erosion were observed about the prosthesis, and fragmentation of the Dacron fibers did not occur.

Thus, by histological review up to 1 year, the prosthesis appears to be well fixed without evidence of rejection or erosion. X-ray evaluation also demonstrated a consistent lack of erosion of cyst formation in the long-term specimens.

Determination of the incorporation and fixation of the prosthesis were undertaken by another means on the contralateral joints. The joints were resected and held in a traction apparatus. Gradually increased traction was applied at the rate of 5 rotations per minute of a lever arm, and the force of resistance was measured on a Chatillon scale at the moment of dislodgment or rupture of the prosthesis.

At 1 week, the prosthesis would pull out of the medullary canal with an average force of 330 gms. At 2 weeks, fixation had increased to withstand an average force of 1,000 gms. By 4 weeks, fixation was sufficiently solid to prevent traction forces from dislodging the prosthesis from the medullary canal prior to rupture of the prosthesis. The prosthesis ruptured under an average force of 1,200 gms.

Traction tests at 8, 16 and 32 weeks uniformly demonstrated continued solid fixation of the prosthesis, with traction forces causing rupture of the prosthesis rather than dislodgment from the medullary canal.

In summary, the experimental evaluation of the Dacron-silicone prosthesis demonstrated no significant tissue reaction to the prosthesis, firm incorporation and fixation of the prosthetic stems in the medullary canal, and no evidence of long term implant rejection or bony erosion.

The results of the experimental studies were thus sufficiently encouraging to justify design and development of a clinical prosthesis. Inlays from the medullary canal of 16 representative human metacarpal and phalangeal bones were taken to determine appropriate sizes for the prosthetic stems. Four stems sizes were found to adequately cover size variations.

Ten patients with severe rheumatoid arthritis underwent metacarpo-phalangeal arthroplasties using the silicone-Dacron prosthesis of this invention. Nine patients had prostheses placed in all four fingers including one case with bilateral procedures. The remaining patient had only the index metacarpo-phalangeal joint replaced. Postoperative observation showed the improvement of alignment, and postoperative X-rays showed improved bony alignment. The prostheses have given adequate lateral stability to prevent recurrence of the ulnar drift and have maintained a satisfactory range of motion. Postoperatively the joint replacements have all remained relatively painless and no cyst formation, erosion or abnormal periosteal reaction has occurred around the prosthesis.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A prosthetic joint, comprising
    a unitary elastomeric member having a central portion and two stems each tapering from a larger cross section end to a smaller cross section end and connected at their larger cross section ends to opposite ends of said central portion,
    so that said stems can be placed into the cavities of two bones to be joined by the prosthetic joint,
    said central portion having a central thin flexing web lying between two thicker end portions, said web being transverse to the stems, and
    a mesh of threads covering each said stem and secured thereto.

2. The joint of claim 1 having internal fabric reinforcement of said elastomeric member extending through both said stems and said central portion.

3. The joint of claim 1 wherein the ends of said central portion from which said stems extend has a flat shelf extending around and beyond said stems.

4. The joint of claim 1 wherein said web is connected to said end portions on one side of said central portion by a V-shaped portion enabling flexing in that direction until the walls of the V-shaped portion meet.

5. The joint of claim 4 in which said web is connected to said end portions on the other side of said central portion by thick portions separated only at said web by a narrow notch enabling only limited flexing in that direction.

6. The joint of claim 4 in which there is a V-shaped portion on both sides of said central portion, enabling flexing in both directions.

7. The joint of claim 1 wherein said elastomer is silicone rubber.

8. The joint of claim 1 wherein said mesh is made of polyester threads.

9. The joint of claim 1 wherein said stems lie along a common axis.

10. The joint of claim 9 wherein said web lies on the same horizontal plane as the axis of the stems, said plane bisecting said stems and said central portion.

11. The joint of claim 10 having internal fabric reinforcement of said elastomeric member extending through both said stems and said central portion generally along said horizontal plane.

12. A surgically implantable prosthetic joint for replacing diseased or damaged bone joints comprising:
   a one-piece body of inherently flexible elastomeric, physiologically inert material,
   said body having a central portion having a width substantially greater than its thickness and having a hinge portion with thickness substantially thinner than the remainder of said body; and
   two oppositely projecting stem portions of reduced width, the cross-sectional dimensions of said stem portions corresponding substantially to the dimensions of the intramedullary canals of the bones adjacent said joint for implantation in the amputated ends of said bones, the width of said central portion extending laterally outwardly on both sides of said stem portions.

13. The joint of claim 12 having a mesh of threads covering each said stem portion and secured thereto.

14. The joint of claim 12 having internal fabric reinforcement for said elastomeric material extending through both said stems and said central portion.

15. A prosthetic joint, comprising
   a unitary elastomeric member having a thin weblike flexing central section joining two thick intermediate sections, each intermediate section being connected to a tapering stem at the larger cross section portion thereof, said stems tapering down to a smaller end portion, so that each said stem can be placed into the cavity of each of two bones to be joined by the prosthetic joint, and
   a mesh of threads covering each said stem and secured thereto.

16. The joint of claim 15 having internal fabric reinforcement of said elastomeric member extending through both said stems, both said intermediate sections, and said central section.

17. The joint of claim 16 wherein said central section is connected to said intermediate sections on one side thereof by a V-shaped portion enabling flexing in that direction until the walls of the V-shaped portion meet and on the other side thereof by thick portions separated only at said central section by a narrow U-shaped notch enabling only limited flexing in that direction.

18. The joint of claim 16 in which there is a V-shaped portion on both sides of said central section, enabling flexing in both directions.

PO-1050
(5/69)

UNITED STATES PATENT OFFICE
CERTIFICATE OF CORRECTION

Patent No. 3,593,342      Dated July 20, 1971

Inventor(s) John J. Niebauer and Paul Kahn

It is certified that error appears in the above-identified patent and that said Letters Patent are hereby corrected as shown below:

First page, line 6 of the heading in left-hand column, "Assignee Cutler Laboratories, Inc." should read --Assignee Cutter Laboratories, Inc.--. First page, line 4 of the "Other References" in the right-hand column, "113" should read --1113--. Column 2, line 60, "THis" should read --This--. Column 3, line 3, "withstand" should read --withstood--; line 5, "st" should read --at--. Column 4, line 18, "stems" should read --stem--.

Signed and sealed this 25th day of January 1972.

(SEAL)
Attest:

EDWARD M. FLETCHER, JR.          ROBERT GOTTSCHALK
Attesting Officer                 Commissioner of Patents